(12) United States Patent
Paramo De la Barrera et al.

(10) Patent No.: US 11,740,378 B2
(45) Date of Patent: Aug. 29, 2023

(54) SEISMIC DATASET ACQUISITION

(71) Applicant: BP Corporation North America Inc., Houston, TX (US)

(72) Inventors: Pedro Paramo De la Barrera, Port of Spain (TT); Linda Hodgson, Aberdeen (GB); Kareem Vincent, Valsayn (TT); Sean Cardinez, St. Joseph (TT)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 1248 days.

(21) Appl. No.: 16/241,235

(22) Filed: Jan. 7, 2019

(65) Prior Publication Data
US 2019/0219719 A1    Jul. 18, 2019

Related U.S. Application Data

(60) Provisional application No. 62/617,090, filed on Jan. 12, 2018.

(51) Int. Cl.
*G01V 1/50* (2006.01)
*G01V 1/36* (2006.01)
(Continued)

(52) U.S. Cl.
CPC .............. *G01V 1/50* (2013.01); *G01V 1/301* (2013.01); *G01V 1/364* (2013.01); *G01V 1/38* (2013.01);
(Continued)

(58) Field of Classification Search
CPC .......... G01V 1/50; G01V 1/3808; G01V 1/46; G01V 2210/22; G01V 2210/23;
(Continued)

(56) References Cited

U.S. PATENT DOCUMENTS 10,031,248 B2    7/2018    Bernitsas et al.
2007/0041271 A1    2/2007    Lecerf
(Continued)

FOREIGN PATENT DOCUMENTS

CN    101285892 A    10/2008
CN    102749648 A    10/2012
(Continued)

OTHER PUBLICATIONS

Kato et al., "Joint AVO Inversion for Time-Lapse Elastic Reservoir Properties", This paper was prepared for presentation at the Abu Dhabi International Petroleum Exhibition & Conference held in Abu Dhabi, UAE, Nov. 11-14, 2012. Copyright 2012, Society of Petroleum Engineers (Year: 2012).*

(Continued)

*Primary Examiner* — Regis J Betsch
(74) *Attorney, Agent, or Firm* — CONLEY ROSE, P.C.

(57) ABSTRACT

A method includes receiving, via a processor, a first seismic dataset generated using a first type of survey system. The method further includes receiving, via the processor, a second seismic dataset generated using a second type of survey system. The method additionally includes determining a frequency band in which to combine the first seismic dataset with the second seismic dataset to generate a combined dataset and generating a seismic image based upon the combined dataset, wherein the seismic image represents hydrocarbons in a subsurface region of the Earth or subsurface drilling hazards.

20 Claims, 7 Drawing Sheets

(51) Int. Cl.
*G01V 1/30* (2006.01)
*G01V 1/38* (2006.01)
*G01V 1/46* (2006.01)

(52) U.S. Cl.
CPC .............. *G01V 1/3808* (2013.01); *G01V 1/46* (2013.01); *G01V 2210/1427* (2013.01); *G01V 2210/22* (2013.01); *G01V 2210/23* (2013.01); *G01V 2210/324* (2013.01); *G01V 2210/612* (2013.01); *G01V 2210/6161* (2013.01)

(58) Field of Classification Search
CPC ....... G01V 2210/324; G01V 2210/612; G01V 2210/6161
See application file for complete search history.

(56) References Cited

U.S. PATENT DOCUMENTS

2013/0030709 A1 1/2013 Ferber
2015/0276956 A1* 10/2015 Khalil ...................... G01V 1/28
702/16

FOREIGN PATENT DOCUMENTS

CN 103344991 A 10/2013
CN 107430204 A 12/2017

OTHER PUBLICATIONS

Pandey et al., "Low Frequency Based Seismic Data Processing: An Effective Tool for Direct Hydrocarbon Indicator in Complex Lithological Environment", This paper was prepared for presentation at the Offshore Technology Conference Asia held in Kuala Lumpur, Malaysia, Mar. 22-25, 2016. (Year: 2016).*
Hale, "Dynamic warping of seismic images", Geophysics, vol. 78, No. 2 (Mar.-Apr. 2013); p. S105-S115 (Year: 2013).*
International Search Report—PCT/US2019/012995 p. 1-3, dated May 15, 2019.
J.E Rickett, et.al.; Cross-equalization data processing for time-lapse seismic reservoir monitoring: A case study from the Gulf of Mexico, Geophysics, vol. 66, No. 4 (Jul.-Aug. 2001) p. 1015-1025, 12 Figs.
Stephen A Hall, et.al; Cross-matching with interpreted warping of 3D streamer and 3D ocean-bottom-cable data at Valhall for time-lapse assessment; Geophysical Prospecting, 2005, 53, 283-297.
Chinese Office Action dated Feb. 21, 2023, for Chinese Application No. 201980008050.5 (15 p.).

* cited by examiner

SEISMIC DATASET ACQUISITION

BACKGROUND

The present disclosure relates generally to acquired seismic datasets, and more specifically, to increasing the spectrum and signal-to-noise ratio of acquired seismic datasets.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing a source and streamers may be useful in the generation of, for example, 3D high resolution (3DHR) seismic images. 3DHR seismic images may, for example, be useful in environments that include shallow hazards and overburden characterization (e.g., characterization of overburden formations inclusive of shale rocks or the like that tend to complicate seismic data acquisition) and 3DHR data typically produce useable frequencies ranging from, for example, approximately 15 Hz to 200 Hz. Seismic acquisition utilizing receivers on the seafloor, e.g., Ocean Bottom Seismic (OBS), tends to generate data (e.g., OBS datasets) that have a narrower bandwidth than 3DHR datasets (e.g., from approximately 2 Hz to 100 Hz). However, OBS datasets may also include improved signal-to-noise ratio (SNR) results at low frequencies (e.g., at less than or equal to approximately 50 Hz, 40 Hz, 35 Hz, etc.) relative to 3DHR datasets. Therefore, the two types of datasets (e.g., 3DHR and OBS) complement each other with respect to bandwidth. Accordingly, present embodiments are directed to techniques for combination of 3DHR and OBS datasets to generate increased bandwidth, signal-to-noise ratio (SNR) characteristics, and resolution of the combined dataset relative to either of the datasets alone.

In some embodiments, the combined dataset created from both the 3DHR and OBS datasets has a broader spectrum having increased SNR for frequencies between, for example, approximately 2 Hz to 200 Hz. For example, the addition of low frequency data from an OBS mirror image to the 3DHR data may provide a significant increase in SNR at low frequencies, for example, between approximately 2 Hz to 35 Hz, thus increasing the resolution of the combined dataset as well as providing an uplift in image quality, better characterization of faults, and/or better identification of shallow channels (e.g., when utilizing red green blue blend spectral decomposition or other seismic data acquisition techniques).

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Seismic data may provide valuable information with regard to the description such as the location and/or change of hydrocarbon deposits within a subsurface region of the Earth. Different seismic acquisition techniques may result in different seismic datasets each having greater resolution across particular frequencies. Accordingly, in one embodiment, a higher resolution image (e.g., a higher quality image) may be generated through the combination of different types of seismic datasets (e.g., seismic data acquired via differing seismic acquisition techniques and/or for different purposes).

Figure 1:
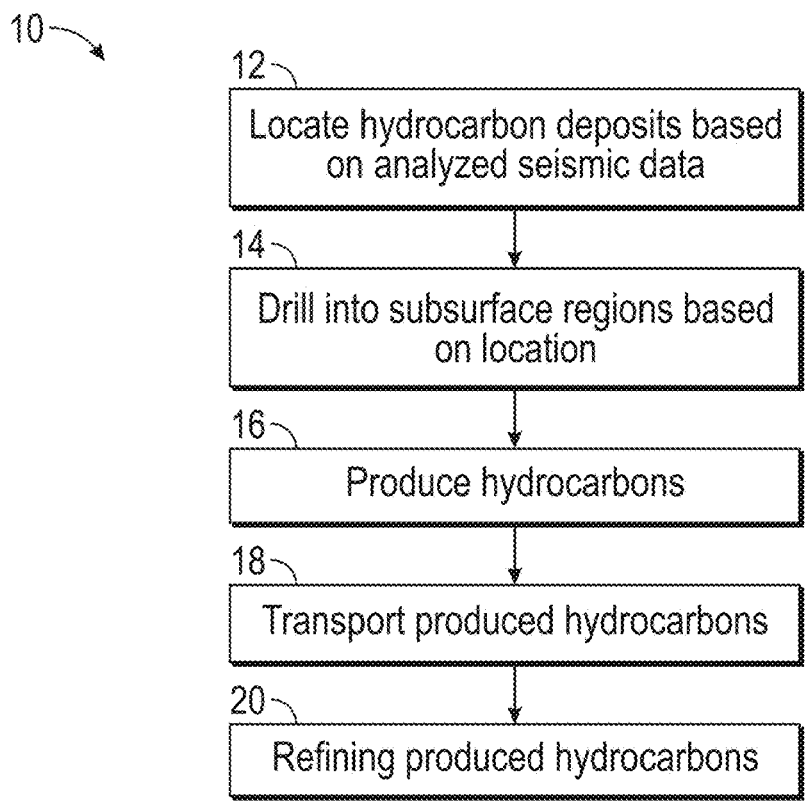
FIG. 1 illustrates a flow chart of various processes that may be performed based on analysis of seismic data acquired via a seismic survey system, in accordance with embodiments presented herein.
Figure 2:
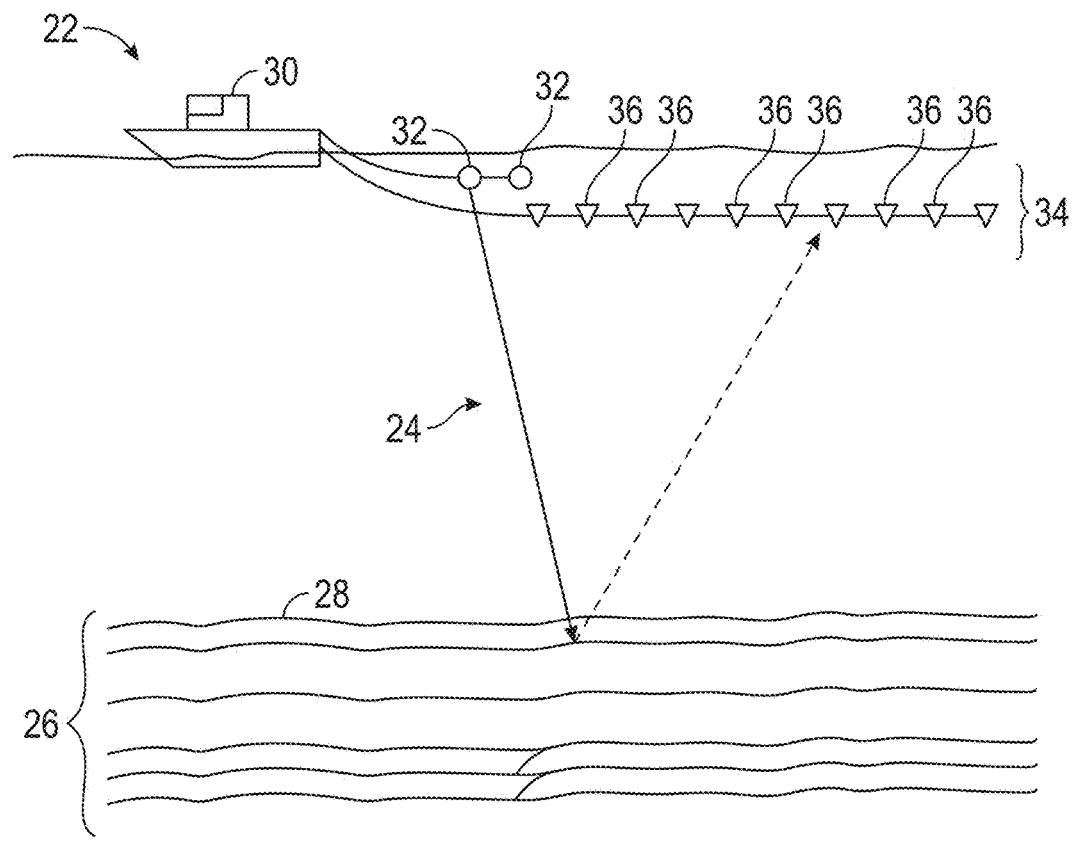
FIG. 2 illustrates a marine survey system in a marine environment, in accordance with embodiments presented herein.
Figure 3:
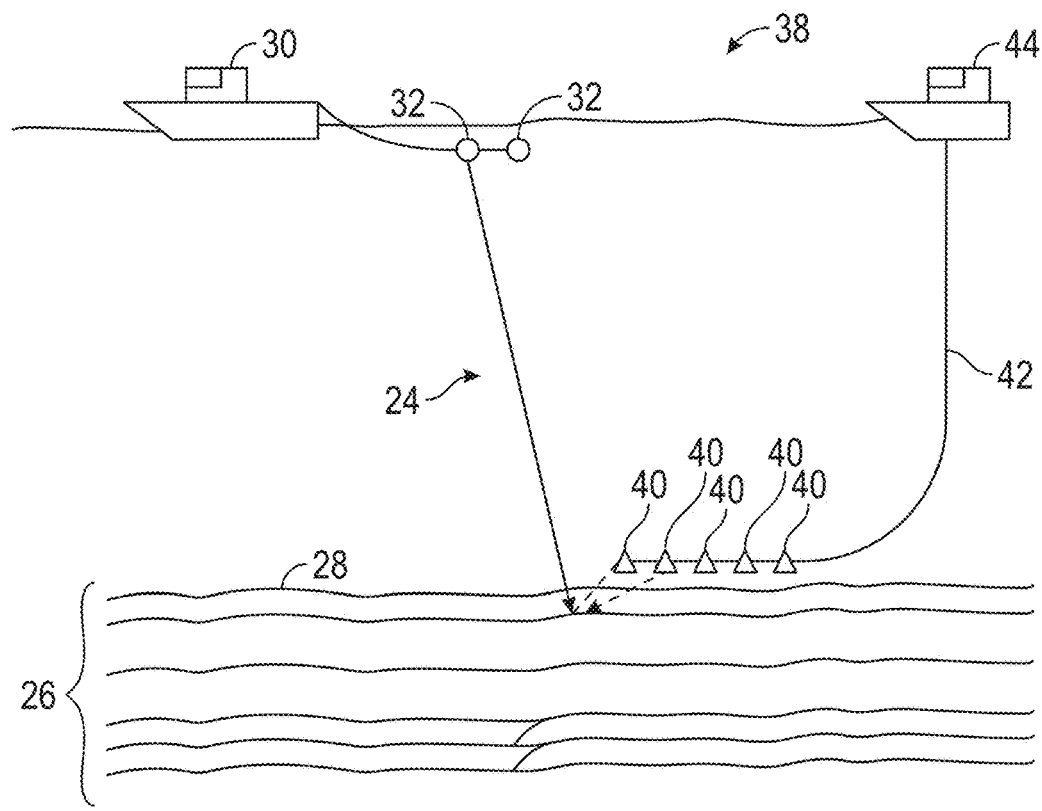
FIG. 3 illustrates a second marine survey system in a marine environment, in accordance with embodiments presented herein

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., an airgun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an airgun array) and one receiver 36 (represented in FIG. 2 as a plurality of hydrophones), it should be noted that the marine survey system 22 may include multiple seismic sources 32 and multiple seismic receivers 36. In the same manner, although the above descriptions of the marine survey system 22 is described with one seismic streamer 34, it should be noted that the marine survey system 22 may include multiple seismic streamers 34. In addition, additional vessels 30 may include additional sources 32, streamers 34, and the like to perform the operations of the marine survey system 22.

In some embodiments, the marine survey system 22 may implement a 2D (e.g., two dimensional) or a 3D (e.g., three dimensional) high-resolution seismic acquisition to acquire a 3D high resolution (3DHR) dataset that may subsequently be processed into one or more 3DHR seismic images that may, for example, be useful in environments that include shallow hazards and/or overburden characterization. A 3DHR dataset may be useful in generating seismic images across frequencies ranging from, for example, approximately 15 Hz to 200 Hz. However, additional seismic acquisition techniques may provide greater resolution seismic images at frequency ranges that differ from those in which the 3DHR dataset is typically applied.

FIG. 3 illustrates an Ocean Bottom Seismic (OBS) system 38 as a second marine survey system (e.g., for use in conjunction with block 12 of FIG. 1) that also may be employed to acquire seismic data (e.g., waveforms) regarding a subsurface region of the Earth in a marine environment. The OBS system 38 may operate to generate seismic data (e.g., OBS datasets). While the illustrated OBS system 38 is an Ocean Bottom Cable (OBC) system inclusive of one or more receivers 40 disposed on the seafloor 28 coupled via a cable 42 to a second vessel 44, other embodiments of an OBS system 38, such as an Ocean Bottom Node (OBN) system or any other seismic system that produces higher signal-to-noise images at differing frequencies compared to those of the marine survey system 22 may be utilized.

As illustrated, the OBS system 38 may include a seismic source 32 (e.g., an airgun array) that is towed by a vessel 30 and which may produce energy, such as sound waves (e.g., seismic waveforms), that is directed at the seafloor 28. This energy may be reflected off of various geological formations within the subsurface region 26 and subsequently acquired (e.g., received and/or recorded) by the one or more receivers 40 disposed on the seafloor 28. For example, data may be stored in the one or more receivers 40 for an extended period of time (e.g., hours, days, weeks, or longer) prior to the stored data being retried (either via cable 42 or wirelessly).

As illustrated, the one or more receivers 40 may be coupled to a vessel 44 (and, in some embodiments, to one another) via the cable 42. Data acquired via the one or more receivers 40 may be transmitted via the cable 42 to the vessel 44 (or, for example, wirelessly if the OBS system 38 is an OBN system).

In some embodiments, the OBS system 38 may be utilized to acquire OBS datasets that are useful in reservoir mapping and characterization. These OBS datasets typically have a bandwidth from approximately 2 Hz to 100 Hz with relatively high signal-to-noise ratio (SNR) results at low frequencies (e.g., at less than or equal to approximately 50 Hz, 40 Hz, 35 Hz, etc.) relative to 3DHR datasets. Therefore, the OBS dataset is complementary with respect to bandwidth a 3DHR dataset acquired via the marine survey system 22 (e.g., acquired via a 2D high-resolution seismic acquisition, a 3D high-resolution seismic acquisition, or the like).

Figure 4:
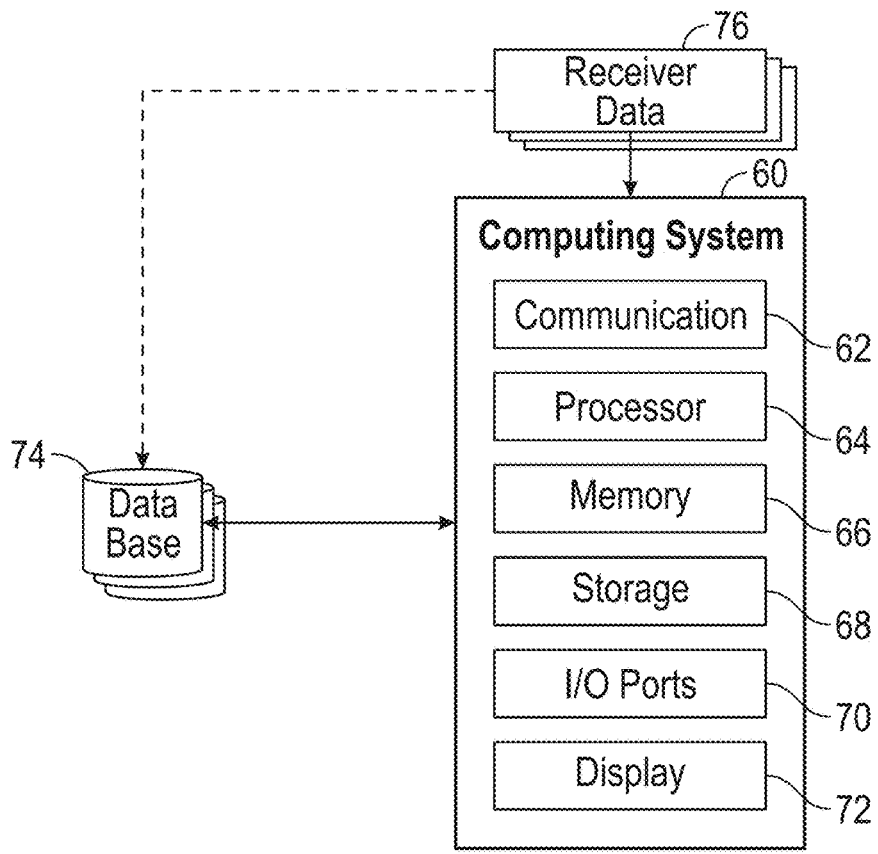
FIG. 4 illustrates a computing system that may perform operations described herein based on data acquired via the marine survey system of FIG. 2 and/or the second marine survey system of FIG. 3, in accordance with embodiments presented herein.

Regardless of how the seismic data is acquired (e.g., via the marine survey system 22 and/or via the OBS system 38), a computing system (e.g., for use in conjunction with block 12 of FIG. 1) may analyze the seismic waveforms acquired by the receivers 36 and/or the receivers 40 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36 and 40 to determine the structure of the geological formations within the subsurface region 26.

Referring now to FIG. 4, the computing system 60 may include a communication component 62, a processor 64, memory 66, storage 68, input/output (I/O) ports 70, and a display 72. In some embodiments, the computing system 60 may omit one or more of the display 72, the communication component 62, and/or the input/output (I/O) ports 70. The communication component 62 may be a wireless or wired communication component that may facilitate communication between the receivers 36 and 40, one or more databases 74, other computing devices, and/or other communication capable devices. In one embodiment, the computing system 60 may receive receiver data 76 (e.g., seismic data, seismograms, 3DHR and OBS datasets, etc.) via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the OBS system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems 60. In this case, each computing system 60 operating as part of a super computer may not include each component listed as part of the computing system 60. For example, each computing system 60 may not include the display component 72 since multiple display components 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 and/or the OBS system 38 and, thus, may monitor and control certain operations of the source 32, the receivers 36 and 40, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the preprocessed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

Figure 5:
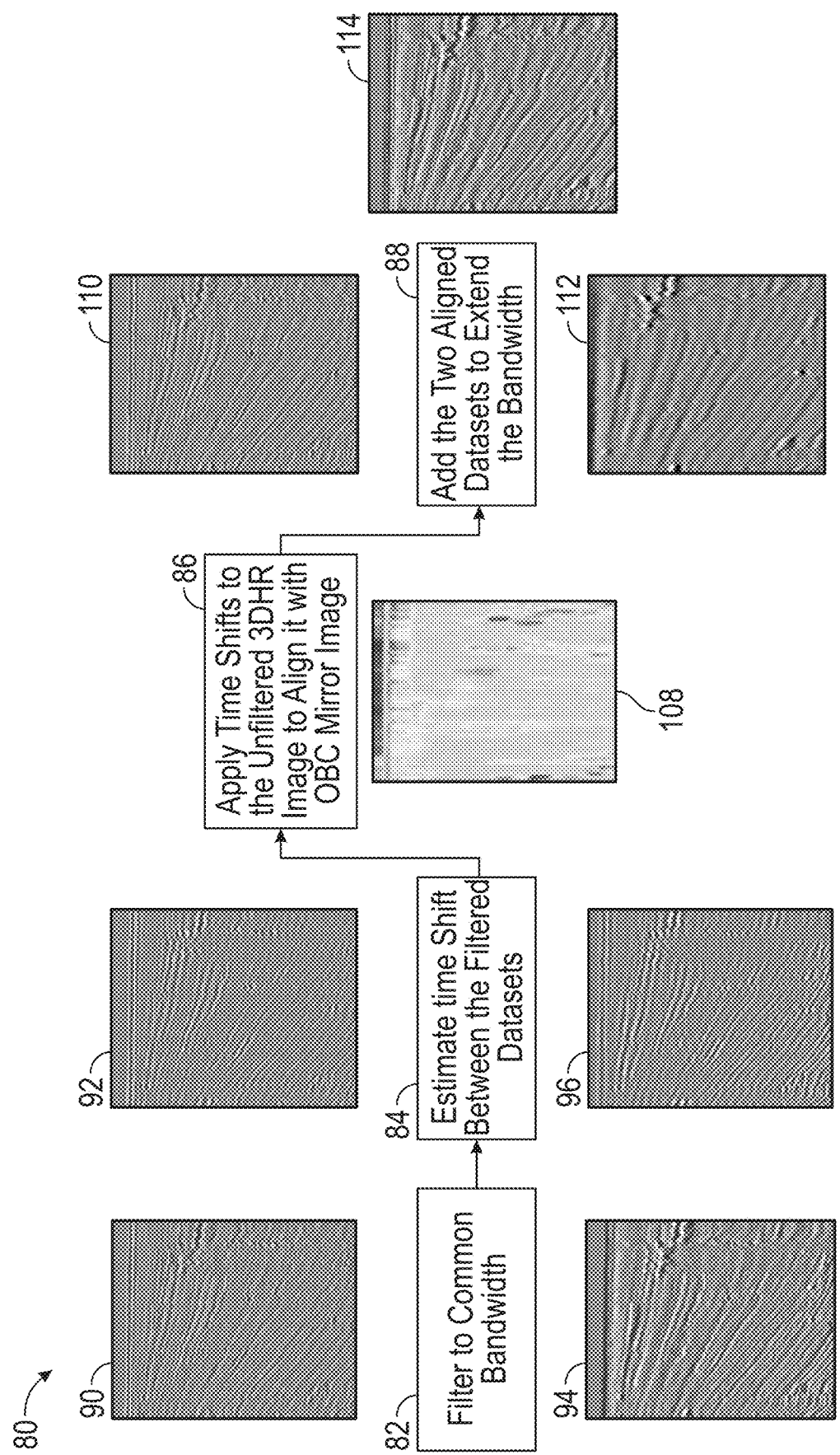
FIG. 5 illustrates a flow chart of a method for combining datasets via the computing system of FIG. 4, in accordance with embodiments presented herein.

With the foregoing in mind, FIG. 5 illustrates a method 80 that may be employed by the computing system 60 to combine separately acquired datasets (e.g., a 3DHR dataset and an OBS dataset or other bandwidth complimentary datasets as desired) to generate a combined dataset having, for example, increased SNR and bandwidth, and accordingly, higher resolution images. In some embodiments, combination of the 3DHR dataset and an OBS dataset may include, for example, a combination of one or more of the 3DHR and OBS images (which, as will be described below, may also include an OBS mirror image). One process to allow for this combination may generally include, for example, alignment of 3DHR and OBS images, analysis of frequency content and signal-to-noise of each of the 3DHR and OBS datasets, selection of which OBS bandwidth is to be added to the 3DHR data (or, alternatively, which 3DHR bandwidth is to be added to the OBS data), and quality control processing of signal-to-noise, extracted wavelets, and/or the images of the datasets.

As illustrated in step 82, to facilitate alignment of the one or more 3DHR and OBS images, both datasets may be filtered to a common bandwidth. Image 90 illustrates a 3DHR image and image 92 illustrates a filtered 3DHR image generated from step 82 that represent the full bandwidth of a 3DHR dataset. Similarly, image 94 illustrates an OBS image (which may, for example, be an OBS mirror image in some embodiments), while image 96 illustrates a filtered OBS image generated from step 82 that represent the full bandwidth of an OBS dataset. The filtering to a common bandwidth may be useful in generating a better estimation of the time shift to facilitate alignment. For example, utilizing a common bandwidth in the estimation of the time shift allows for alignment of features of the images 92 and 96 (e.g., alignment of peaks and troughs of the images 92 and 96).

It may be appreciated that use of an OBS mirror image may compensate for gaps in the receivers 40 whereby the surface of the ocean 24 or other body of water can operate as a mirror for redirecting energy back towards the seafloor 28 and the receivers 40 as secondary energy sources that can allow for imaging. Effectively, OBS mirror images can operate to represent an image that otherwise would be generated from, for example, a greater density of receivers 40 and, therefore, can provide an image with more spatial coverage in the shallow portions than otherwise would by typically available for a given density of receivers 40.

Figure 6:
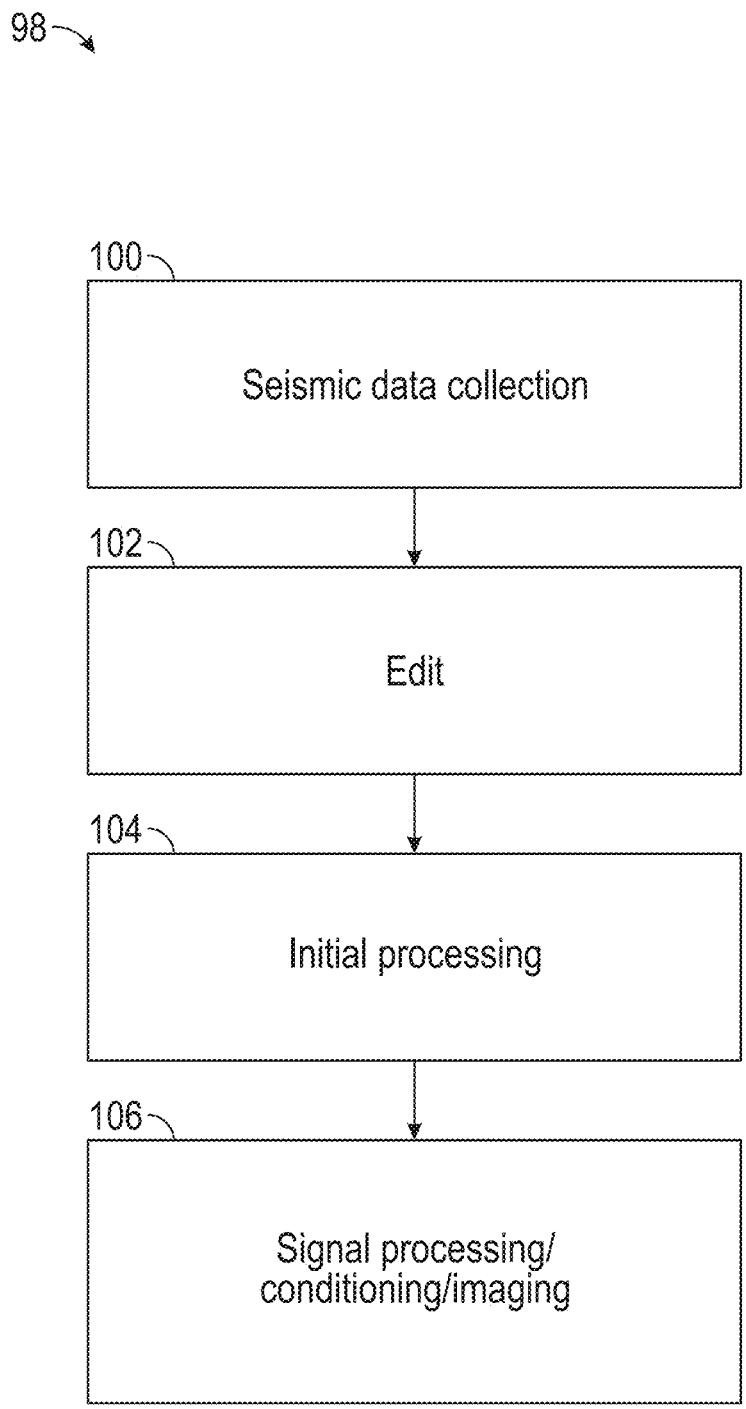
FIG. 6 illustrates a flow chart of a method for generating a seismic image via the computing system of FIG. 4, in accordance with embodiments presented herein.

In some embodiments, the images 90 and/or 94 may be generated in conjunction with a seismic processing scheme such as, for example, the method 98 illustrated in FIG. 6. As illustrated, method 98 includes a seismic processing sequence that includes seismic data collection in step 100, editing of the seismic data in step 102, initial processing in step 104, and signal processing, conditioning, and imaging (which may, for example, include production of imaged sections or volumes) in step 106 prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. In some embodiments, in generating image 90, the seismic processing undertaken by computing system 60 may include binning the 3DHR seismic data to a 3D grid as well as production of a 3D Kirchhoff Pre-stack Time Migration going down to, for example, a 2 seconds of Two Way Traveltime (TWT) (e.g., the elapsed time for energy to be transmitted from the seismic source 32, reflect from a subsurface point and travel back to the receiver 36, which may differ from the 2 seconds described above based on, for example, environmental factors, source and/or receiver placement or depth, or the like) to generate one or more 3DHR images.

Likewise, in some embodiments, the seismic processing undertaken by computing system 60 in generating image 94, may include production of a detailed Full Waveform Inverse (FWI) velocity model, which may be used for a Tilted Transverse Isotropy (TTI) Kirchhoff Pre-stack Depth Migration (KPDM). This migration may operate to provide a step change in seismic images in the area while additionally improving amplitude fidelity and producing accurate Amplitude Versus Offset (AVO). Additionally, the OBS Pre-stack Depth Migration may be converted to time to the same TWT length of the marine survey system 22 in order to match it with the 3DHR migrated image. In some embodiments, OBS seismic images produced by the KPDM of the upgoing wavefield lack images in the very shallow regions in between, for example, cables of an OBC system. The larger the cable spacing, the larger and deeper the associated image gap that results therefrom. Accordingly, to match the OBS and 3DHR images, the image gaps, for example, can be solved however by using the down-going field of the OBS dataset to produce a mirror image, as described above. Therefore, an OBS mirror image covering the same extent as the 3DHR images from the seafloor 28 may be generated as the image 94.

It may be appreciated that the foregoing are examples processing schemes that might be utilized with seismic data to generate the images 90 and 94 and any chosen seismic processing scheme may use processes drawn from some or all of the aforementioned steps.

Returning to FIG. 5, a time shift volume between the two filtered datasets (e.g., illustrated as image 92 representing a filtered 3DHR image and image 96 illustrating a filtered OBS) is calculated (or estimated) in step 84. These time shifts may be applied, in step 86, to the full bandwidth 3DHR image (i.e., image 90) to produce a 3DHR image that is aligned with the OBS image, as illustrated via image 110 (e.g., a full bandwidth and time shifted image). Accordingly, image 108 may represent a timeshift volume while image 110 may represent a 3DHDR image aligned with an OBS image. In some embodiments, 1D timeshift may be sufficient to properly align the datasets, such that no 3D warping is required. However, in other embodiments, 3D warping may instead be utilized to produce a 3DHR image that is aligned with the OBS image.

In step 88, the aligned 3DHR and OBS datasets may be analyzed, for example, by the computing system 60 and subsequently combined. This combination may be whole (e.g., for all frequencies of the 3DHR dataset to be combined with all frequencies of the OBS mirror image, such that image 114 is the combination of image 110 and 94) or partial (e.g., one or more determined and/or selected frequency ranges of the OBS dataset may be combined with the 3DHR image that is aligned with the OBS image, for example, so that image 112 represents a portion of the full OBS dataset represented by image 94 having been chosen (e.g., filtered) to a particular frequency band, for example, a low frequency band between 2 Hz and 35 Hz).

The SNR the 3DHR datasets and OBS datasets at different frequencies may be compared and based on the comparison, a frequency band may be chosen in which the OBS dataset, illustrated as image 112, and may be combined with (e.g., added to) the 3DHR dataset of image 110, which is illustrated in FIG. 5 as image 114 of the combined 3DHR datasets and OBS datasets (i.e., the image 112 representing a frequency band, for example, a low frequency band between 2 Hz and 35 Hz of the OBS dataset may be chosen and combined with the image 110 to generate image 114).

In some embodiments, the frequency band may be chosen such that the OBS dataset combined with the 3DHR dataset is selected whenever the OBS dataset has a higher SNR than the 3DHR dataset. However, other parameters for selection of the frequency band may be employed. For example, selection of a frequency band may be based upon enhancement of the SNR of the combined dataset relative to the 3DHR dataset in addition to producing desired wavelet values (e.g., high resolution wavelets) for the combined dataset. In some embodiments, combining the OBS dataset from 2 Hz to 35 Hz provides an improved image, such as image 114 relative to either image 90 or image 94.

Figure 7:
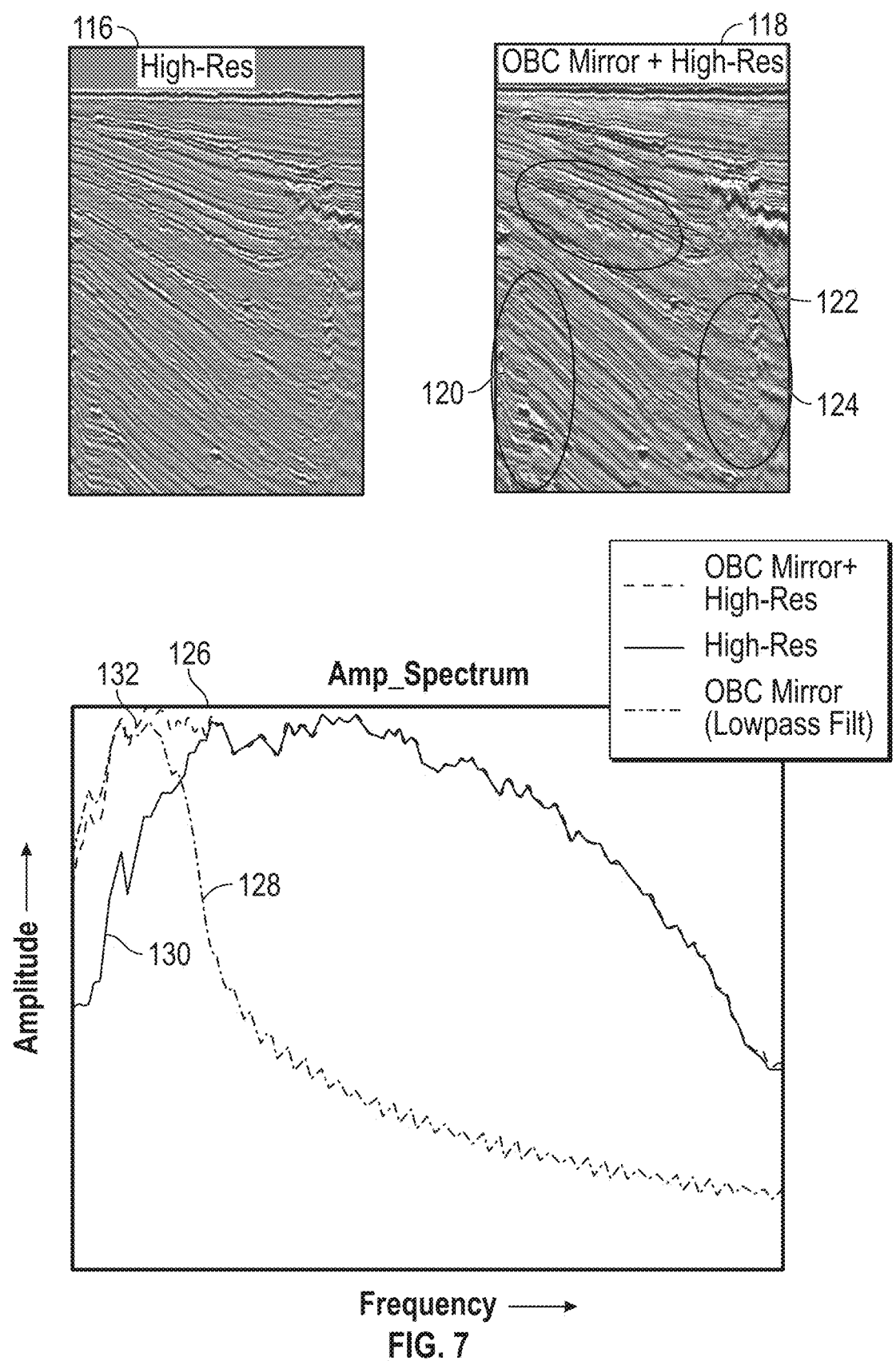
FIG. 7 illustrates an example of seismic images generated by the computing system of FIG. 4, in accordance with embodiments presented herein.

FIG. 7 illustrates a more detailed view of a generated 3DHR image 116, a combined dataset image 118 (e.g., illustrative of a frequency band combined OBS dataset with a 3DHR dataset), and an example of a graph 126 illustrating the amplitude spectra for the filtered OBS dataset 128, the 3DHR dataset 130, and the combined dataset 132 (e.g., the combined OBS dataset 128 and 3DHR dataset 130 for a selected frequency band). As illustrated, the combined dataset image 118 includes regions 120, 122, and 124 that exhibit improved fault and channel definition, displays folds with higher resolution, and displays improved continuity of different events. Additionally, combined dataset image 118 includes less side lobe energy on the seafloor 28 reflection. Furthermore, as illustrated in graph 126, the combined dataset 132 possesses a broader spectrum and a bandwidth that ranges from approximately, for example, 2 Hz to 200 Hz.

Figure 8:
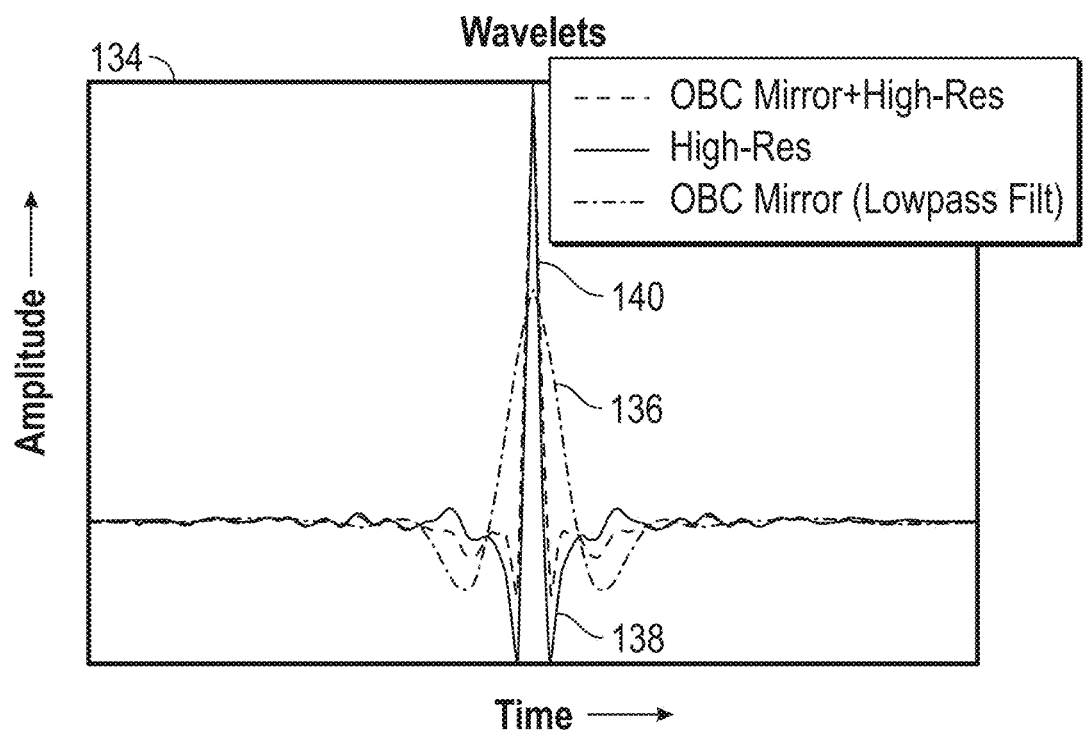
FIG. 8 illustrates a graph of wavelets utilized in the combining of datasets in FIG. 5, in accordance with embodiments presented herein.

As previously noted, producing desired wavelet values (e.g., high resolution wavelets) for the combined dataset may also be a factor in selecting the frequency band in which the OBS dataset is combined with the 3DHR dataset. FIG. 8 illustrates a graph 134 of an extracted wavelet 136 of the OBS dataset (e.g., filtered to 2 Hz to 35 Hz), an extracted wavelet 138 of the 3DHR dataset, and an extracted wavelet 140 of the combined dataset. As may be appreciated, the extracted wavelet 138 of the 3DHR dataset and the extracted wavelet 140 of the combined dataset are narrower (e.g., tighter) than the extracted wavelet 136 of the OBS dataset and, additionally, there is less side lobe energy with respect to the extracted wavelet 140 of the combined dataset than present in the extracted wavelet 138 of the 3DHR dataset. Similarly, the extracted wavelet 136 of OBS data has a wider wavelet present and greater side lobe energy with respect to the extracted wavelet 140 of the combined dataset. Additionally, a combination (e.g., addition) of the extracted wavelet 138 of the 3DHR dataset to the extracted wavelet 136 of the OBS dataset will produce the extracted wavelet 140 of the combined dataset.

In some embodiments, comparison of these extracted wavelets 136, 138, and/or 140 (and, in some embodiments, in conjunction with the SNR of the 3DHR dataset, the OBS dataset, and the combined dataset) may be a portion of the selection process for determination of which frequency band of the OBS dataset is chosen to be combined with the 3DHR dataset. For example, a bandwidth portion of the OBS image may be selected so that when the selected bandwidth of the OBS image (e.g., a low frequency bandwidth between, for example, 2 Hz and 35 Hz) is combined with the 3DHR, the combined dataset maximizes available SNR at all frequencies when producing the best available resolution wavelet (i.e., corresponding to the extracted wavelet 140). Alternatively, for example, a bandwidth portion of the OBS image may be selected so that when the selected bandwidth of the OBS image is combined with the 3DHR image, the best possible SNR at all frequencies is generated with a lesser priority placed on having a corresponding best possible resolution wavelet present. In this manner, the bandwidth of the OBS image combines with the 3DHR image may be tailored based on desired results.

Figure 9:
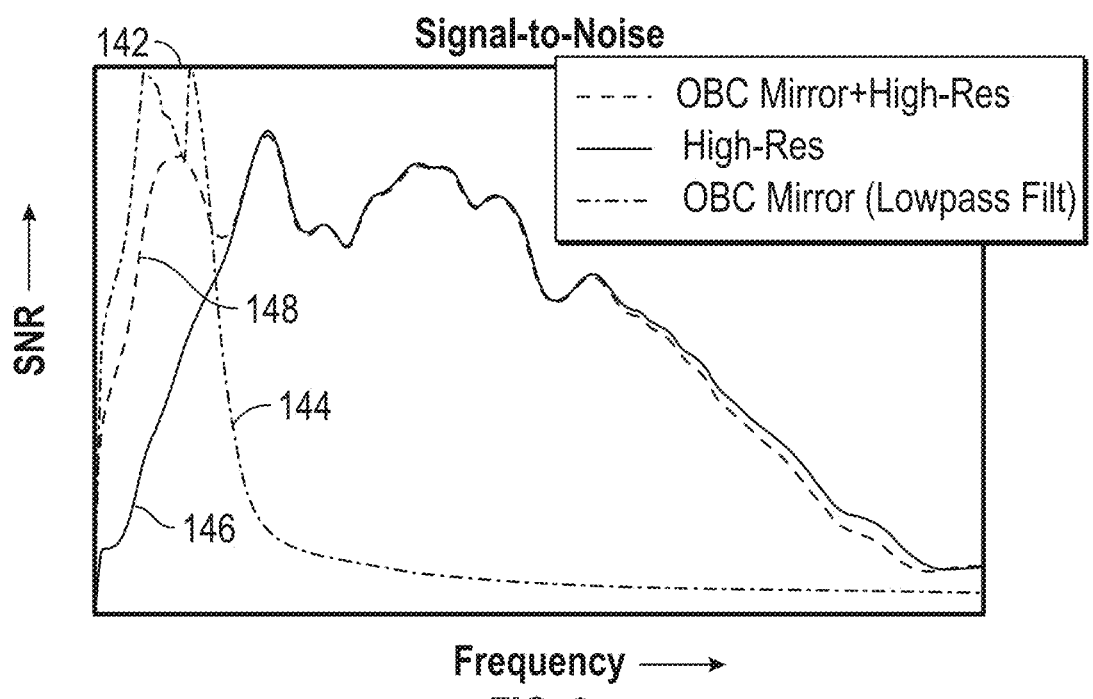
FIG. 9 illustrates a graph of the signal-to-noise ratio of various datasets generated by the computing system of FIG. 4, in accordance with an embodiment.

Turning to FIG. 9, graph 142 illustrates an example a combined dataset 148 (combining the OBS dataset 144 and the 3DHR dataset 146) that may be generated. As illustrated, the combined dataset 148 has a broader bandwidth spectrum than the 3DHR dataset 146 and also has increased SNR at the low end of the illustrated spectrum, relative compared to the 3DHR dataset 146. In this manner, FIG. 9 provides a visual illustration of advantages in selecting a particular bandwidth of the OBS image to be combined with the 3DHR image. In this manner, the information presented in FIGS. 8 and 9 may be utilized in determining the frequency cutoff for OBC bandwidth selection and the combined dataset 148 of FIG. 9 may operate as an indication of whether the SNR of the combined dataset 148 was correctly maximized or optimized, as generated based upon the increased SNR selected bandwidth of the OBS image that is combined with the 3DHR image discussed above with respect to FIG. 8.

Figure 10:
FIG. 10 illustrates Red-Green-Blue blended spectral decomposition surfaces of datasets generated by the computing system of FIG. 4, in accordance with an embodiment.
Figure 10:
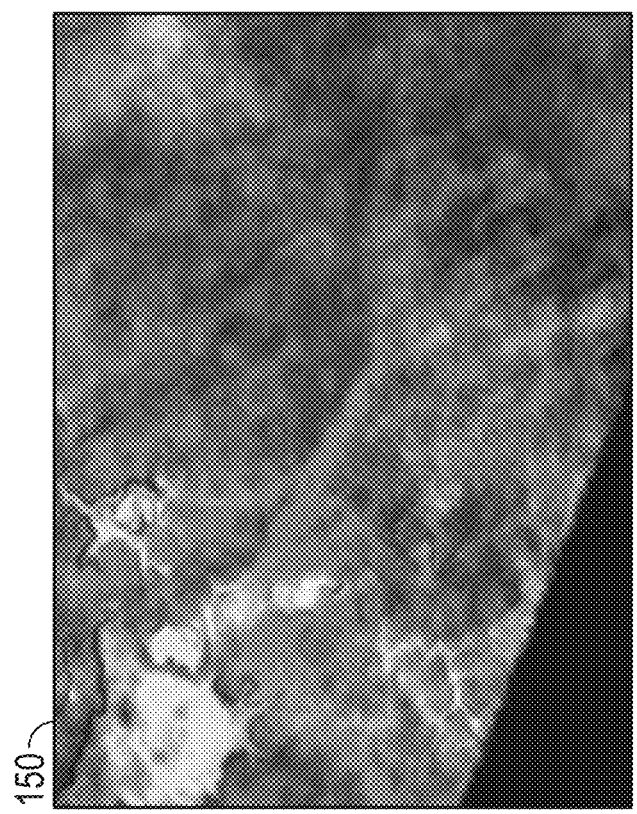

FIG. 10 illustrates additional advantages of generating a combined dataset. A red-green-blue (RGB) blended spectral decomposition surface of a 3DHR dataset 150 between 300 ms to 400 ms TWT and a RGB blended spectral decomposition surface of a combined dataset 152 between 300 ms to 400 ms TWT are illustrated in FIG. 10. The RGB blended spectral decomposition surface of a 3DHR dataset 150 generally includes more noise and includes obscured details of smaller scale features relative to the RGB blended spectral decomposition surface of a combined dataset 152. Likewise, the RGB blended spectral decomposition surface of a combined dataset 152 has less noise (i.e., is cleaner) and better illustrates details of both small scale and large scale channels with greater definition relative to the RGB blended spectral decomposition surface of a 3DHR dataset 150.

Accordingly it may be appreciated that a combined dataset (e.g., a combined 3DHR and OBS dataset) may be generated to have a broader spectrum with higher SNR values for complementary spectral datasets. Analysis on section views of the combined dataset may provide, for example, an uplift in image quality and SNR, better characterization of faults, and better identification of shallow channels for example, when using RGB blend spectral decomposition.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method performed by a processor of a computing system, comprising:
receiving a first seismic dataset generated in response to a first type of survey system imparting a first plurality of seismic signals into a subsurface region of Earth, wherein the first seismic dataset is based on the first plurality of seismic signals, and wherein the first type of survey system is a marine survey system disposed along a surface of a body of water;
receiving a second seismic dataset in response to a second type of survey system imparting a second plurality of seismic signals into the subsurface region of Earth, wherein the second seismic dataset is based on the second plurality of seismic signals, and wherein the second type of survey system is an ocean bottom seismic system; and
processing the first seismic dataset and the second seismic dataset to generate a seismic image, wherein said processing comprises:
filtering the first seismic dataset to generate a first filtered seismic dataset having a first bandwidth;
filtering the second seismic dataset to generate a second filtered seismic dataset having the first bandwidth;
estimating a time shift volume between the first filtered seismic dataset and the second filtered seismic dataset;
applying the time shift volume to the first seismic dataset to generate an aligned dataset;
determining a frequency band and a portion of the second seismic dataset based on a signal-to-noise ratio (SNR) of the first seismic dataset and the second seismic dataset;
combining the aligned dataset with the portion of the second seismic dataset to generate a combined dataset having the frequency band; and
generating a seismic image based upon the combined dataset, wherein the seismic image represents hydrocarbons in the subsurface region of the Earth or subsurface drilling hazards.

2. The method of claim 1, wherein the SNR of the combined dataset has a value greater than a second SNR of the first seismic dataset and a third SNR of the second seismic dataset at respective frequencies.

3. The method of claim 1, wherein the first seismic dataset comprises a first bandwidth complimentary to a second bandwidth of the second seismic dataset.

4. The method of claim 1, comprising extracting a first wavelet based upon the first seismic dataset.

5. The method of claim 4, comprising extracting a second wavelet based upon the second seismic dataset.

6. The method of claim 5, comprising utilizing the first wavelet and the second wavelet, with the SNR of the first seismic dataset and the SNR of the second seismic dataset, in determining the frequency band in which to combine the first seismic dataset with the second seismic dataset to generate the combined dataset.

7. The method of claim 1, comprising generating a three dimensional high-resolution seismic image as the seismic image.

8. The method of claim 1, wherein applying the time shift volume to the first seismic dataset to generate the aligned dataset includes applying a three-dimensional warping to the first seismic dataset.

9. The method of claim 1, wherein the second type of survey system covers a bandwidth from 2 hertz (Hz) to 100 Hz.

10. The method of claim 1, wherein the first type of survey system covers a bandwidth from 15 hertz (Hz) to 200 Hz.

11. A tangible, non-transitory, machine-readable media, comprising instructions configured to cause a processor to:
receive a first seismic dataset in response to a first type of survey system being deployed to impart a first plurality of seismic signals into a subsurface region of Earth, wherein the first seismic dataset is based on the first plurality of seismic signals and wherein the first type of survey system is a marine survey system disposed along a surface of a body of water;
receive a second seismic dataset in response to a second type of survey system being deployed to impart a second plurality of seismic signals into the subsurface region of the Earth, wherein the second seismic dataset is based on the second plurality of seismic signals, and wherein the second type of survey system is an ocean bottom seismic system;
filter the first seismic dataset to generate a first filtered seismic dataset having a first bandwidth;
filter the second seismic dataset to generate a second filtered seismic dataset having the first bandwidth;
estimate a time shift volume between the first filtered seismic dataset and the second filtered seismic dataset;
apply the time shift volume to the first seismic dataset to generate an aligned dataset;

determine a frequency band and a portion of the second seismic dataset based on a signal-to-noise ratio (SNR) of the first seismic dataset and the second seismic dataset;

combine the aligned dataset with the portion of the second seismic dataset to generate a combined dataset having the frequency band and an increased SNR at the frequency band relative to a second SNR of the first seismic dataset at the frequency band; and generate a seismic image based upon the combined dataset, wherein the seismic image represents hydrocarbons in the subsurface region of the Earth or subsurface drilling hazards.

12. The tangible, non-transitory, machine-readable media of claim 11, comprising instructions configured to cause the processor to transmit the combined dataset for generation of a seismic image based upon the combined dataset, wherein the seismic image represents hydrocarbons in a subsurface region of Earth or subsurface drilling hazards.

13. The tangible, non-transitory, machine-readable media of claim 11, comprising instructions configured to cause the processor to select the portion of the second seismic dataset.

14. The tangible, non-transitory, machine-readable media of claim 13, comprising instructions configured to cause the processor to extract a first wavelet from the aligned dataset.

15. The tangible, non-transitory, machine-readable media of claim 14, comprising instructions configured to cause the processor to extract a second wavelet from the portion of the second seismic dataset.

16. The tangible, non-transitory, machine-readable media of claim 15, comprising instructions configured to cause the processor to utilize the first wavelet and the second wavelet, with the SNR of the first seismic dataset and the SNR of the second seismic dataset, in determining the frequency band in which to combine the aligned dataset with the portion of the second seismic dataset to generate the combined dataset.

17. A device, comprising:
a memory configured to store instructions; and
a processor coupled to the memory and configured to execute the instructions, which, when executed, cause the processor to be configured to:
receive a first seismic dataset in response to a first type of survey system being deployed to impart a first plurality of seismic signals into a subsurface region of Earth, wherein the first seismic dataset is based on the first plurality of seismic signals and wherein the first type of survey system is a marine survey system disposed along a surface of a body of water;
receive a second seismic dataset in response to a second type of survey system being deployed to impart a second plurality of seismic signals into the subsurface region of the Earth, wherein the second seismic dataset is based on the second plurality of seismic signals, and wherein the second type of survey system is an ocean bottom seismic system;
filter the first seismic dataset to generate a first filtered seismic dataset having a first bandwidth;
filter the second seismic dataset to generate a second filtered seismic dataset having the first bandwidth;
estimate a time shift volume between the first filtered seismic dataset and the second filtered seismic dataset;
apply the time shift volume to the first seismic dataset to generate an aligned dataset;
determine a frequency band and a portion of the second seismic dataset based on a signal-to-noise ratio of the first seismic dataset and the second seismic dataset;
combine the aligned dataset with the portion of the second seismic dataset to generate a combined dataset having the frequency band; and
generate a seismic image based upon the combined dataset, wherein the seismic image represents hydrocarbons in the subsurface region of the Earth or subsurface drilling hazards.

18. The device of claim 17, wherein the processor is configured to select the portion of the second seismic dataset.

19. The device of claim 18, wherein the processor is configured to:
extract a first wavelet from the aligned dataset;
extract a second wavelet from the portion of the second seismic dataset; and
utilize the first wavelet and the second wavelet in determining a frequency band in which to combine the aligned dataset with the portion of the second seismic dataset to generate the combined dataset.

20. The device of claim 17, wherein the combined dataset comprises an increased SNR at the frequency band relative to a second SNR of the first seismic dataset at the frequency band.

* * * * *